United States Patent [19]

Northcutt

[11] Patent Number: 5,774,373
[45] Date of Patent: Jun. 30, 1998

[54] APPARATUS AND METHOD FOR MEASURING AN OBJECT'S ANGULAR INCLINATION IN MULTIPLE AXES

[75] Inventor: Jeffrey Duane Northcutt, Sunnyvale, Calif.

[73] Assignee: Sun Microsystems, Inc., Mountain View, Calif.

[21] Appl. No.: 655,563

[22] Filed: May 20, 1996

[51] Int. Cl.$^6$ .................................................. G01C 9/06
[52] U.S. Cl. .......................... 364/559; 364/550; 33/366
[58] Field of Search .................................. 364/559, 550, 364/556, 576; 33/366, 312, 313

[56] References Cited

U.S. PATENT DOCUMENTS 4,486,844  12/1984  Brunson et al. ......................... 364/559
4,779,353  10/1988  Lopes et al. ............................. 33/366
5,365,671  11/1994  Yaniger .................................... 33/366
5,416,977   5/1995  Striffler .................................... 33/366

*Primary Examiner*—James P. Trammell
*Assistant Examiner*—Shah Kaminis
*Attorney, Agent, or Firm*—Flehr Hohbach Test Albritton & Herbert LLP; William S. Galliani

[57] ABSTRACT

A position sensing apparatus has an insulating body with an interior surface defining a void within the insulating body. Electrodes extend through the body and terminate as electrical contacts on the interior surface. Two non-mixing fluids with distinct electrical properties are positioned in the void. This results in a first set of electrical signals on a first set of electrical contacts and a second set of electrical signals on a second set of electrical contacts. The first set of electrical signals and the second set of electrical signals specify a first angular inclination value (pitch) and a second angular inclination value (roll) characterizing the position of the sensing apparatus.

20 Claims, 4 Drawing Sheets

APPARATUS AND METHOD FOR MEASURING AN OBJECT'S ANGULAR INCLINATION IN MULTIPLE AXES

BRIEF DESCRIPTION OF THE INVENTION

This invention relates generally to position sensing, for example, in virtual reality systems. More particularly, this invention relates to an electronic device used to measure the angular inclination of an object in multiple axes.

BACKGROUND OF THE INVENTION

It is frequently useful to measure the angle of inclination of a particular object with respect to some defined plane. For example, a device, generically referred to herein as an "inclinometer", may be used to determine whether a platform (e.g., a car or an airplane) is level with respect to the horizon. Inclinometers may also be used in virtual reality systems to determine the angle of a viewer's head with respect to a computer display. Similarly, inclinometers can be used to measure displacements around a pair of axes of rotation (e.g., for use in a pointing device that moves a cursor left/right and up/down, or as a wireless "joystick" used in flight simulators and virtual reality simulators).

Inclinometers are implemented as single axis devices. That is, existing inclinometers use a separate device to measure each axis of interest. One known single axis inclinometer implementation is to attach a pendulum to a set of potentiometers. The movement of the pendulum generates potentiometer output signals that are used to specify a physical position.

Another known single axis inclinometer is a contact-based tilt-switch. A contact-based tilt switch consists of a conductive element and a pair of contacts which are electrically shorted together in one orientation and open in another. Example tilt-switches include mercury tilt-switches, tilt-switches with a metal ball in an enclosure with a pair of wires which are shorted by simultaneous contact with the ball, and a tilt-switch unit with a conducting rod suspended at its top and with its freely pivoting bottom positioned within a conducting ring such that the conducting rod and conducting ring create an electrical short when the unit is inclined in a particular physical orientation.

There are a number of problems with existing inclinometers. First, they operate in only one axis.

Thus, if two axes are to be measured, two devices are needed. It would be highly desirable to provide a single inclinometer device that can measure the angle of inclination in two axes (say, the pitch and roll of a device).

Another problem with existing inclinometers is that they are intricate physical structures that are relatively expensive to manufacture. Moreover, they tend to be relatively large. Thus, it would be highly desirable to provide an inclinometer of reduced size that is easy to manufacture.

Another problem with existing inclinometers is that they rely upon moving parts and therefore they are susceptible to wear, progressive inaccuracy, and breakdown. Consequently, it would be highly desirable to provide an inclinometer that is not susceptible to physical degradation of this type.

A related problem with existing inclinometers is that their accuracy is limited by the physical constraints of the implementing device. It would be highly desirable to avoid some of the accuracy limitations stemming from the physical constraints of existing devices.

Another problem with existing inclinometers is that the angle they measure is fixed with respect to the body upon which they are mounted. It would be desirable to provide an inclinometer that can operate with respect to an arbitrary reference point.

SUMMARY OF THE INVENTION

The invention is a position sensing apparatus comprising an insulating body with an internal surface defining a void within the insulating body. Electrodes extend through the body and terminate as electrical contacts on the internal surface. Two non-mixing fluids with distinct electrical properties are positioned in the void. This results in a first set of electrical signals on a first set of electrical contacts touching the first fluid and a second set of electrical signals on a second set of electrical contacts touching the second fluid. The first set of electrical signals and the second set of electrical signals are used to derive a first angular inclination value (pitch) and a second angular inclination value (roll) characterizing the position of the sensing apparatus. In other words, a pair of angular inclination values (i.e., pitch and roll) can be derived from the pattern of electrical signals which are created through the position of the fluids with respect to the insulating body.

There are a number of benefits associated with the invention. A primary benefit of the invention is that a single device can be used to measure an object's angular inclination in multiple axes. In addition, the apparatus can be implemented as a sealed, largely solid-state device. Consequently, it has a small size, it is relatively easy to manufacture, and it is relatively inexpensive. Moreover, the "solid-state" implementation avoids moving parts (although a moving fluid exists) and their attendant problems. Other benefits associated with the invention include the fact that it provides precision measurements and that it can be used in arbitrary physical orientations for both absolute and relative angular displacement measurements.

BRIEF DESCRIPTION OF THE DRAWINGS

For a better understanding of the nature and objects of the invention, reference should be made to the following detailed description taken in conjunction with the accompanying drawings, in which.

Like reference numerals refer to corresponding parts throughout the several views of the drawings.

DETAILED DESCRIPTION OF THE INVENTION

Figure 1:
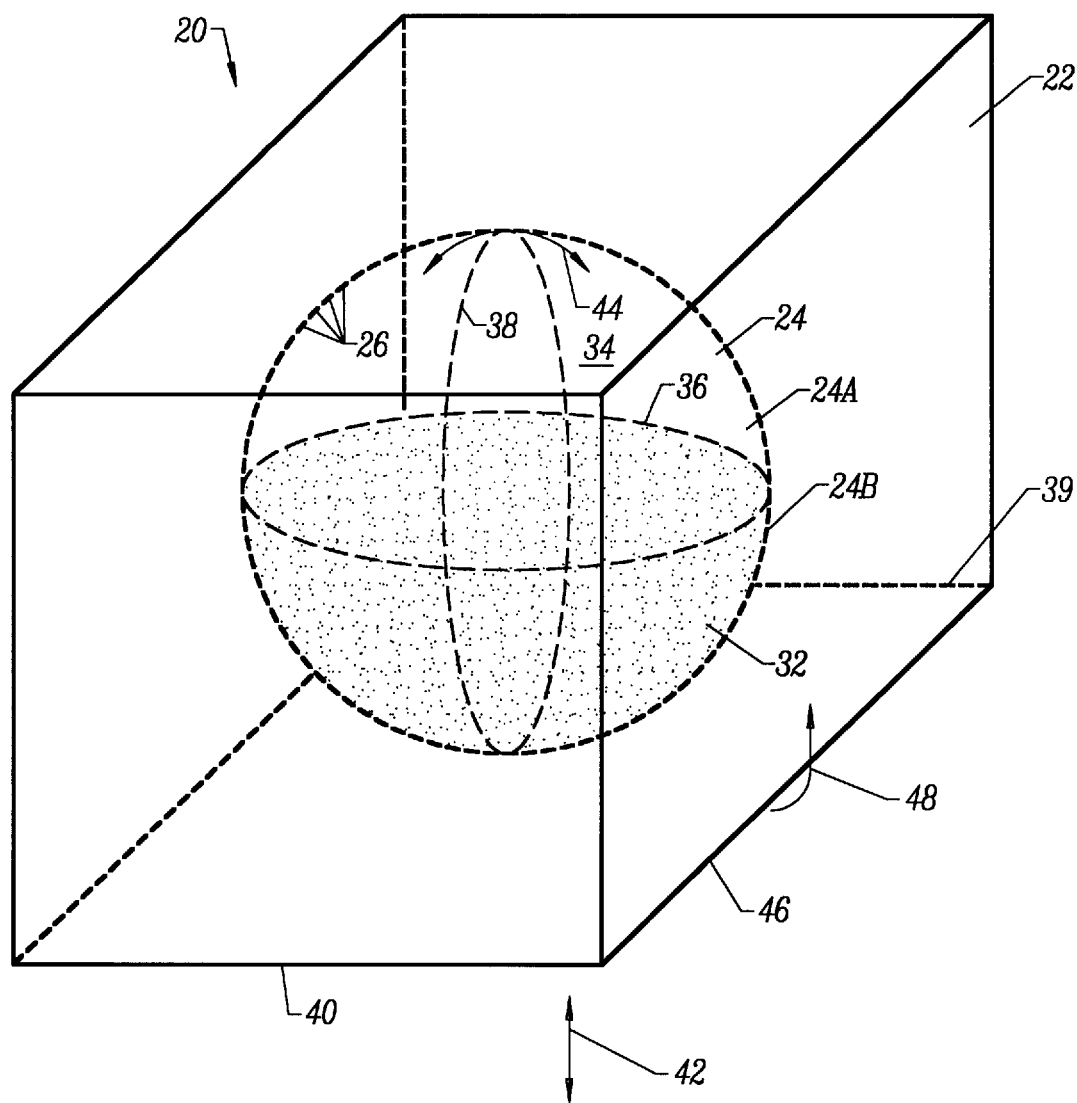
FIG. 1 illustrates a sensing device in accordance with the invention.

FIG. 1 illustrates a position sensing device 20 in accordance with the invention. The device 20 includes an insulating body 22 which defines a void 24. The void is illustrated as having a spherical shape, but other shapes are feasible. The surface of the void has a set of electrical contacts 26.

Figure 2:
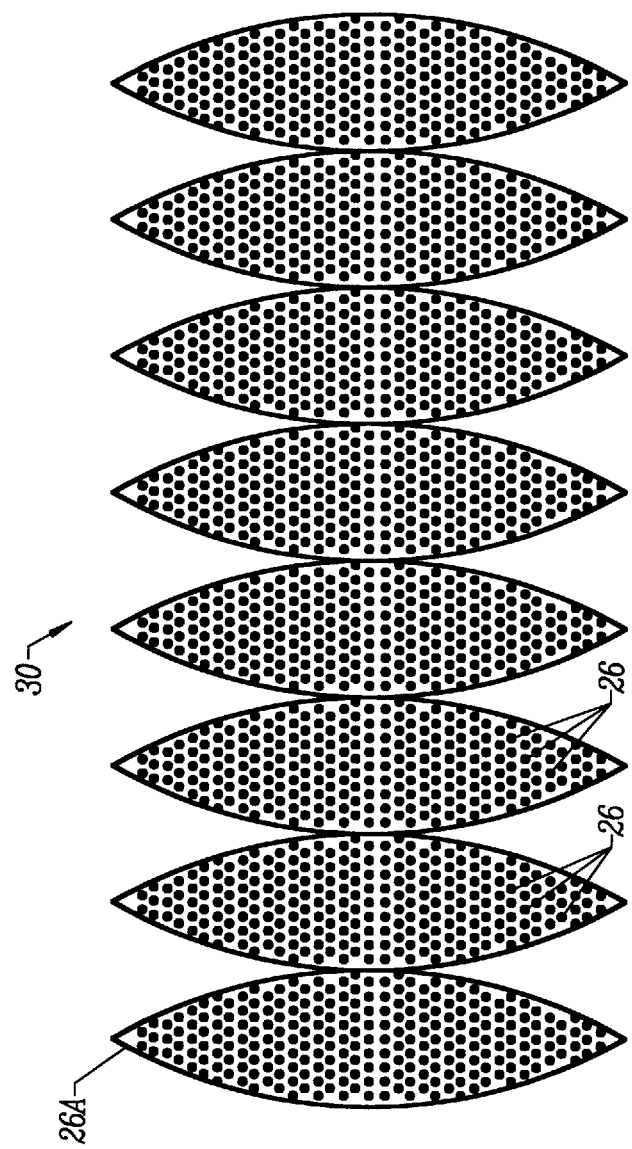
FIG. 2 illustrates a map of sensor points within the interior surface of the void of the sensing device of FIG. 1.

FIG. 2 is a two-dimensional projection of the internal surface 30 which forms the void 24. FIG. 2 clearly illustrates the nature of the electrical contacts 26 of the internal surface 30.

Returning now to FIG. 1, it can be observed that the void 24 includes a first fluid 32 and a second fluid 34. The fluids are selected so that they do not intermix. That is, one fluid has a significantly lower density than the other fluid. Consequently, one fluid floats above the other, dividing the interior sphere into two separate, and distinct regions. This phenomenon is illustrated in FIG. 1. Note that a planar surface 36 separates a first void region 24A and a second void region 24B.

The two fluids are also selected such that they have different electrical properties (e.g., conductivity, capacitance, etc.). Consequently, the electrical signals generated on the electrical contacts 26 in the first void region 24A are distinct from the electrical signals generated on the electrical contacts 26 in the second void region 24B. For example, the first fluid may be mercury and the second fluid may be air. In this case, the electrical contacts 26 touching the mercury will allow current to flow between them, while the electrical contacts 26 touching the air will not permit the flow of current. Similarly, a saline solution and oil can be used and again the difference in conductivity can be sensed with the electrical contacts 26. Alternately, a pair of fluids with different dielectric properties can be used and the sensing method can be capacitive. That is, in this case, the electrical contacts 26 are used to sense the difference in capacitive values associated with the two fluids.

Regardless of the type of fluid employed, distinct electrical signals are used to characterize the physical position of the device 20. In other words, by monitoring the electrical signals generated on the electrical contacts 26, it is possible to monitor the position of the fluids within the void region 24. The position of the fluids within the void region 24 is a function of the physical orientation of the device 20 with respect to gravity.

The angular inclination of the planar surface 36 can be measured in two axes (i.e., pitch and roll) with the present invention. That is, the present invention provides a single inclinometer that can measure position in two axes.

FIG. 1 illustrates a first angular inclination path 38. This path can be referred to as the pitch path. The pitch value associated with a pitch path measures the up and down motion of the device 20. For example, if edge 39 were held in place while edge 40 was lifted up and down, as shown by arrow 42, the pitch values along the pitch path would change.

FIG. 1 also illustrates a second angular inclination path 44, which is orthogonal to the first angular inclination path 38. The second angular inclination path 44 can be referred to as the roll path. The roll values associated with the roll path measure the rotational action of the device 20. For example, if edge 46 was held in place while the device 20 was rotated around the axis defined by edge 46, as shown by arrow 48, the roll values along the roll path would change.

In view of the foregoing, it can be appreciated that the position of the two fluids within the void 24 can be monitored with the electrical contacts 26. The positional information can then be correlated with the pitch and roll of the device 20. One implementation to achieve this result is illustrated with reference to FIGS. 3 and 4.

Figure 3:
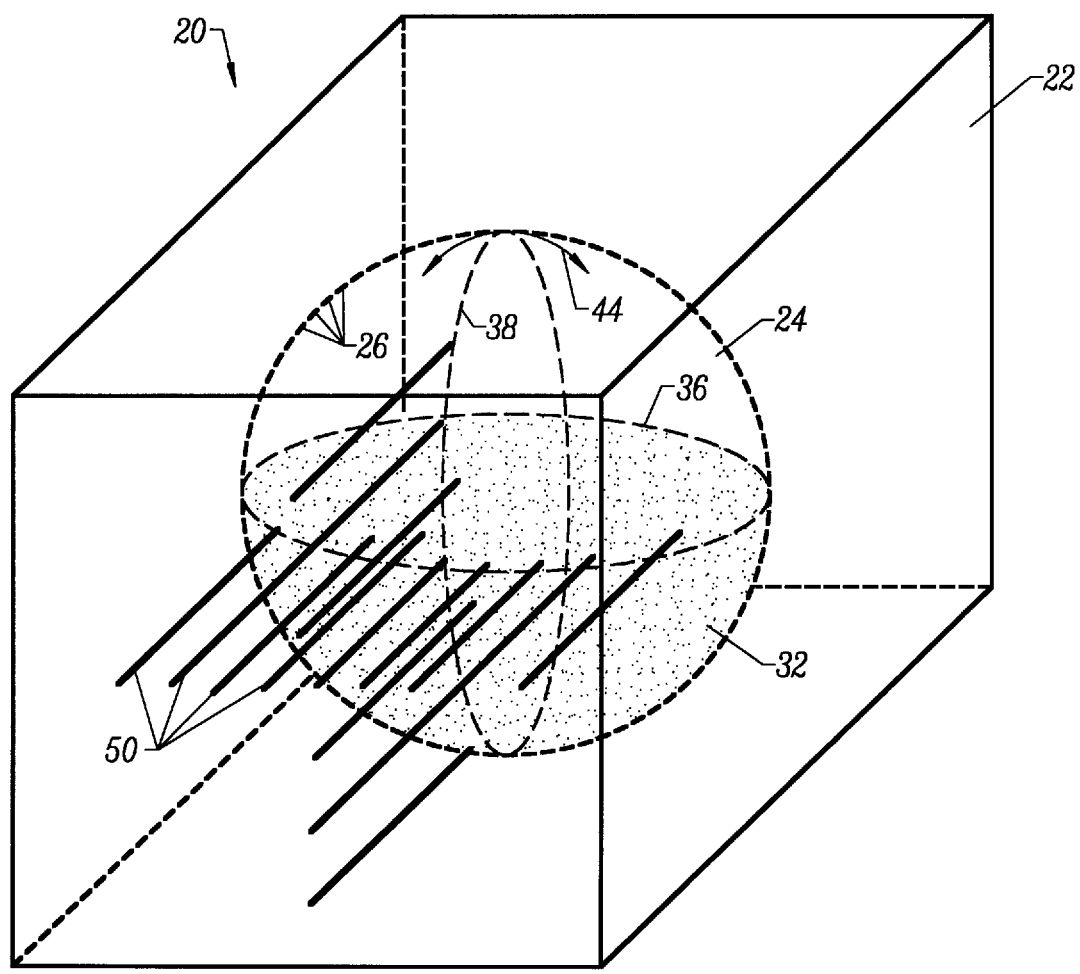
FIG. 3 illustrates an example placement of a set of electrodes used in accordance with the sensing device of FIG. 1.

FIG. 3 corresponds to FIG. 1, but shows a set of electrodes 50 extending from the electrical contacts 26, through the insulating body 22, to the outer perimeter of the insulating body 22. For the purpose of clarity, most of the electrodes for the electrical contacts 26 are not shown.

Figure 4:
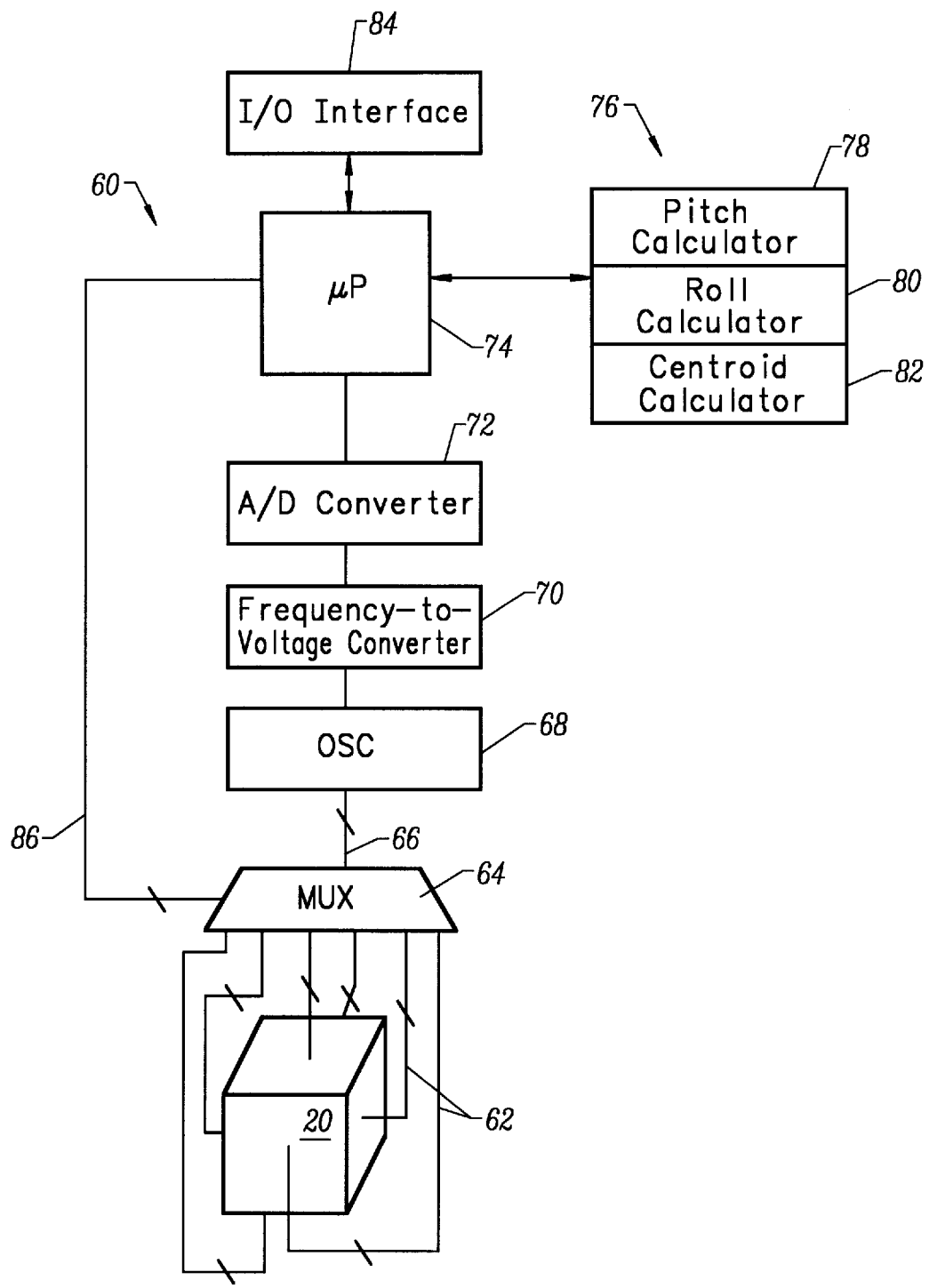
FIG. 4 illustrates a measurement device incorporating the sensing device of FIG. 1.

With the electrodes 50 extending to the outer perimeter of the insulating body 22, electrical connections can be made between the electrodes and sensing device conductors 62, as shown in FIG. 4. FIG. 4 illustrates an embodiment of the invention that measures different capacitive values on the electrical contacts 26 of the void 24.

In the embodiment of FIG. 4, the sensing device conductors 62 are connected to the input nodes of a multiplexer 64. The output nodes 66 of the multiplexer 64 carry sequential electrical signals from the electrical contacts 26. Each signal is applied to an oscillator 68. The oscillator 68 operates at a frequency corresponding to the capacitive value of the signal applied to it. This resultant frequency signal is applied to a frequency-to-voltage converter 70. As its name implies, the frequency-to-voltage converter 70 transforms the received frequency signal into a corresponding voltage signal. The resultant voltage signal is then applied to an analog-to-digital converter 72, which converts the received analog voltage signal into a corresponding digital signal. The digital signal is then applied to a microprocessor 74.

Thus, the microprocessor 74 receives a digital signal which characterizes whether a selected electrical contact 26 within the void 24 is in contact with the first or second fluid. The microprocessor 74 is programmed to be aware of the physical position of each electrical contact 26 within the void 24. It is also programmed to coordinate each signal received from the analog-to-digital converter 72 with each electrical contact position. For example, by using the select lines 86 connected to the multiplexer 64, the microprocessor 74 can direct the multiplexer 64 to obtain the electrical signal from electrical contact 26A, shown in FIG. 2. Through the previously described processing associated with elements 68 through 72, a digital signal is received by the microprocessor 74. The digital signal characterizes the electrical value associated with electrical contact 26A. That is, the value of the digital signal is contingent upon whether it is in contact with the first or second fluid. The microprocessor 74 notes this information and proceeds to process subsequent electrical contacts 26.

FIG. 4 illustrates that the microprocessor 74 operates in conjunction with a memory 76. The memory 76 includes a set of executable programs including a pitch calculator 78, a roll calculator 80, and a centroid calculator 82. The centroid calculator 82 includes a set of instructions to process the signals from the electrical contacts 26, coordinate the signals with the physical positions of the electrical contacts 26, and derive a centroid, or center of mass, value therefrom using well-known mathematical calculations. This computation can be done using morphological transformations, and through interpolation techniques can be done with an accuracy which is greater than the spacing of the electrical contacts 26. Using these interpolation techniques, some of the accuracy limitations stemming from the physical constraints of the device can be avoided. By locating the centroid of one fluid or the other with respect to the electrical sensors embedded within the insulating body, it is possible to determine either the roll and pitch of the sensing body. Given the location of the center of mass of one of the fluids, it is possible to sense either the current orientation of the sensing body with respect to the natural horizon (i.e., absolute pitch and roll), or with respect to some other defined orientation (i.e., relative roll and pitch). These known calculations are performed by the pitch calculator 78 and the roll calculator 80.

FIG. 4 also illustrates that the microprocessor 74 is connected to an input-output interface 84. The input-output interface 84 may include standard devices used to program the microprocessor 74, to select the mode of operation (e.g., absolute position, relative position), and display the results associated with the operation of the microprocessor 74.

The sensing device 20 of the invention may be formed in a variety of ways. For example, an insulating plane with a conductor pattern may be laminated to another such device, etc., until half of a sensing device 20 is formed. The resultant device may form one-half of the final device, or it may require machining to form the void 24. The first fluid is then positioned within the resultant void segment. Similar steps may then be taken for the other half of the device. The two device halves may then be laminated together to form a final device. Another technique for forming the device of the invention is to support, with a mold, a matrix of electrodes associated with one-half of the device. A resin can then be poured into the mold. After the resin dries, half of the void can be machined out of the device segment. Similar steps are then repeated for the other half of the device. A variety of semiconductor processing techniques may also be used. Preferably, the device is formed as a cube with a size less than 3 cm$^3$, preferably approximately 1 cm$^3$.

Those skilled in the art will recognize that a primary benefit of the invention is that a single device can be used to measure an object's angular inclination in multiple axes. In addition, the apparatus can be implemented as a "solid-state" device. Consequently, it has a small size, it is relatively easy to manufacture, and it is relatively inexpensive. Moreover, the solid-state implementation avoids moving parts and their attendant problems. Other benefits associated with the invention include the fact that it provides precision measurements. In addition, it can be used in arbitrary physical orientations since the microprocessor 74 can be programmed to account for any physical orientation.

The foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

I claim:

1. A position sensing apparatus, comprising:
    an insulating body with an internal surface defining a void within said insulating body;
    a set of electrical contacts positioned on said internal surface and insulated from one another by said insulating body;
    a set of electrodes connected to said set of electrical contacts and extending through said insulating body to the outer perimeter of said insulating body;
    a first fluid, with a first electrical property, positioned within said void of said insulating body; and
    a second fluid, with a second electrical property distinct from said first electrical property, positioned within said void of said insulating body, said first fluid and said second fluid being selected such that they do not intermix and thereby divide said void into a first region and a second region, said first region presenting a first set of electrical signals on the electrical contacts within said first region and said second region presenting a second set of electrical signals on the electrical contacts within said second region, wherein said first set of electrical signals and said second set of electrical signals specify a first angular inclination value corresponding to the pitch of said insulating body and a second angular inclination value corresponding to the roll of said insulating body.

2. The apparatus of claim 1 further comprising a multiplexer with input nodes connected to said set of electrodes and multiplexer output nodes carrying multiplexer output signals.

3. The apparatus of claim 2 further comprising an oscillator with an oscillator input node connected to said multiplexer output nodes and an oscillator output node carrying an oscillator output frequency signal varying as a function of said multiplexer output signals.

4. The apparatus of claim 3 further comprising a frequency-to-voltage converter with an input node connected to said oscillator output node and a frequency-to-voltage converter output node carrying a voltage signal corresponding to said oscillator output frequency signal.

5. The apparatus of claim 4 further comprising an analog-to-digital converter with an input node connected to said frequency-to-voltage converter output node and an analog-to-digital converter output node carrying a digital signal corresponding to said voltage signal.

6. The apparatus of claim 5 further comprising a microprocessor connected to said analog-to-digital converter output node, said microprocessor processing said digital signal.

7. The apparatus of claim 6 wherein said microprocessor includes a pitch calculator to specify said first angular inclination value.

8. The apparatus of claim 6 wherein said microprocessor includes a roll calculator to specify said second angular inclination value.

9. The apparatus of claim 6 wherein said microprocessor includes a centroid calculator.

10. The apparatus of claim 6 wherein said microprocessor generates a set of select commands for said multiplexer.

11. A method of constructing a position sensing apparatus, said method comprising the steps of:
    providing an insulating body with an internal surface defining a void within said insulating body;
    positioning a set of electrical contacts on said internal surface that are insulated from one another by said insulating body;
    connecting a set of electrodes to said set of electrical contacts such that the electrodes extend through said insulating body to the outer perimeter of said insulating body;
    inserting a first fluid, with a first electrical property, within said void of said insulating body; and
    inserting a second fluid, with a second electrical property distinct from said first electrical conductivity, within said void of said insulating body, said first fluid and said second fluid being selected such that they do not intermix and thereby form a surface that divides said void into a first region and a second region, said first region presenting a first set of electrical signals on the electrical contacts within said first region and said second region generating a second set of electrical signals on the electrical contacts within said second region, wherein said first set of electrical signals and said second set of electrical signals specify a first angular inclination value corresponding to the pitch of said insulating body and a second angular inclination value corresponding to the roll of said insulating body.

12. The method of claim 11 further comprising the step of connecting the input nodes of a multiplexer to said set of electrodes, said multiplexer generating multiplexer output signals that are applied to multiplexer output nodes.

13. The method of claim 12 further comprising the step of connecting the input node of an oscillator to said multiplexer output nodes, said oscillator generating on an oscillator output node an oscillator output frequency signal varying as a function of said multiplexer output signals.

14. The method of claim 13 further comprising the step of connecting the input node of a frequency-to-voltage converter to said oscillator output node, said frequency-to-voltage converter generating on a frequency-to-voltage converter output node a voltage signal corresponding to said oscillator output frequency signal.

15. The method of claim 14 further comprising the step of connecting the input node of an analog-to-digital converter to said frequency-to-voltage converter output node, said analog-to-digital converter generating on an analog-to-digital converter output node a digital signal corresponding to said voltage signal.

16. The method of claim 15 further comprising the step of connecting a microprocessor to said analog-to-digital converter output node, said microprocessor processing said digital signal.

17. The method of claim 16 further comprising the step of using a pitch calculator in conjunction with said microprocessor to specify said first angular inclination value.

18. The method of claim 16 further comprising the step of using a roll calculator in conjunction with said microprocessor to specify said second angular inclination value.

19. The method of claim 16 further comprising the step of using a centroid calculator in conjunction with said microprocessor to specify a center of mass value.

20. The method of claim 16 further comprising the step using said microprocessor to generate a set of select commands for application to said multiplexer.

\* \* \* \* \*